United States Patent
Wiederin

(10) Patent No.: US 11,073,146 B1
(45) Date of Patent: Jul. 27, 2021

(54) SYSTEM AND METHOD FOR CONTROLLING PERISTALTIC PUMPS

(71) Applicant: Elemental Scientific, Inc., Omaha, NE (US)

(72) Inventor: Daniel R. Wiederin, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 489 days.

(21) Appl. No.: 15/637,182

(22) Filed: Jun. 29, 2017

Related U.S. Application Data

(60) Provisional application No. 62/356,308, filed on Jun. 29, 2016.

(51) Int. Cl.
*F04B 49/06* (2006.01)
*F04B 43/12* (2006.01)
*F04B 49/20* (2006.01)
*G05D 11/02* (2006.01)
*H01J 49/04* (2006.01)

(52) U.S. Cl.
CPC ............ *F04B 49/065* (2013.01); *F04B 43/12* (2013.01); *F04B 49/20* (2013.01); *G05D 11/02* (2013.01); *H01J 49/0445* (2013.01); *F04B 2207/0412* (2013.01)

(58) Field of Classification Search
CPC ........ F04B 43/12; F04B 49/08; F04B 49/065; F04B 49/20; F04B 43/1253; F04B 43/1238; G05D 11/02; H01J 49/0445; H01J 49/105; H01J 49/045
See application file for complete search history.

(56) References Cited

U.S. PATENT DOCUMENTS

| | | | | | |
|---|---|---|---|---|---|
| 4,204,430 | A | * | 5/1980 | Tamm | G01N 35/1095 73/1.02 |
| 4,702,679 | A | * | 10/1987 | Malbec | F04B 43/1253 417/475 |
| 4,865,993 | A | * | 9/1989 | Cassaday | B01L 3/508 436/52 |
| 6,211,956 | B1 | * | 4/2001 | Nicoli | G01N 15/02 356/337 |
| 7,986,399 | B2 | * | 7/2011 | Stark | G01N 1/4077 356/36 |
| 8,438,939 | B1 | * | 5/2013 | Wiederin | G01N 1/22 73/864.22 |
| 9,177,772 | B1 | * | 11/2015 | Wiederin | H01J 49/045 |
| 10,192,726 | B1 | * | 1/2019 | Wiederin | G01N 35/1097 |
| 2002/0011437 | A1 | * | 1/2002 | Kaito | G01N 30/34 210/198.2 |
| 2015/0275170 | A1 | * | 10/2015 | Nankervis | C12M 41/48 435/325 |

FOREIGN PATENT DOCUMENTS

EP 3539586 A1 * 9/2019 ........... A61M 1/3444

* cited by examiner

*Primary Examiner* — Nathan C Zollinger
(74) *Attorney, Agent, or Firm* — Advent, LLP; Kevin E. West

(57) ABSTRACT

A system for controlling peristaltic pumps includes a first peristaltic pump configured to drive a carrier fluid, a second peristaltic pump configured to drive a diluent fluid, a third peristaltic pump configured to drive an internal standard, spike or matrix solution, and a controller for adjusting respective flow rates of the first, second, and third peristaltic pumps. The controller is configured to run the second peristaltic pump at least at a minimum predetermined flow rate whenever the third peristaltic pump is active.

8 Claims, 5 Drawing Sheets

SYSTEM AND METHOD FOR CONTROLLING PERISTALTIC PUMPS

CROSS-REFERENCE TO RELATED APPLICATIONS

The present application claims the benefit under 35 U.S.C. § 119(e) of U.S. Provisional Application Ser. No. 62/356,308, filed Jun. 29, 2016, and titled "SYSTEM AND METHOD FOR CONTROLLING PERISTALTIC PUMPS," which is incorporated herein by reference in its entirety.

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis. In some cases, peristaltic pumps are used to dilute an internal standard, spike or matrix solution and/or a sample for analysis with spectrometry equipment.

SUMMARY

A system for controlling peristaltic pumps is disclosed. In an embodiment, the system includes a first peristaltic pump, a second peristaltic pump, a third peristaltic pump, and a controller configured to control respective flow rates of the pumps. The first peristaltic pump can be configured to drive a carrier fluid. The second peristaltic pump can be configured to drive a diluent fluid. The third peristaltic pump can be configured to drive an internal standard, spike or matrix solution. The controller is configured to adjust respective flow rates of the first, second, and third peristaltic pumps. The controller can be configured to run the second peristaltic pump at least at a minimum predetermined flow rate whenever the third peristaltic pump is active.

A method for controlling peristaltic pumps is also disclosed. In an implementation, the method includes: driving a carrier fluid with a first peristaltic pump; driving a diluent fluid with a second peristaltic pump; driving an internal standard, spike or matrix solution with third peristaltic pump; and adjusting respective flow rates of the first, second, and third peristaltic pumps at least in part by running the second peristaltic pump at least at a minimum predetermined flow rate whenever the third peristaltic pump is active.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1A:
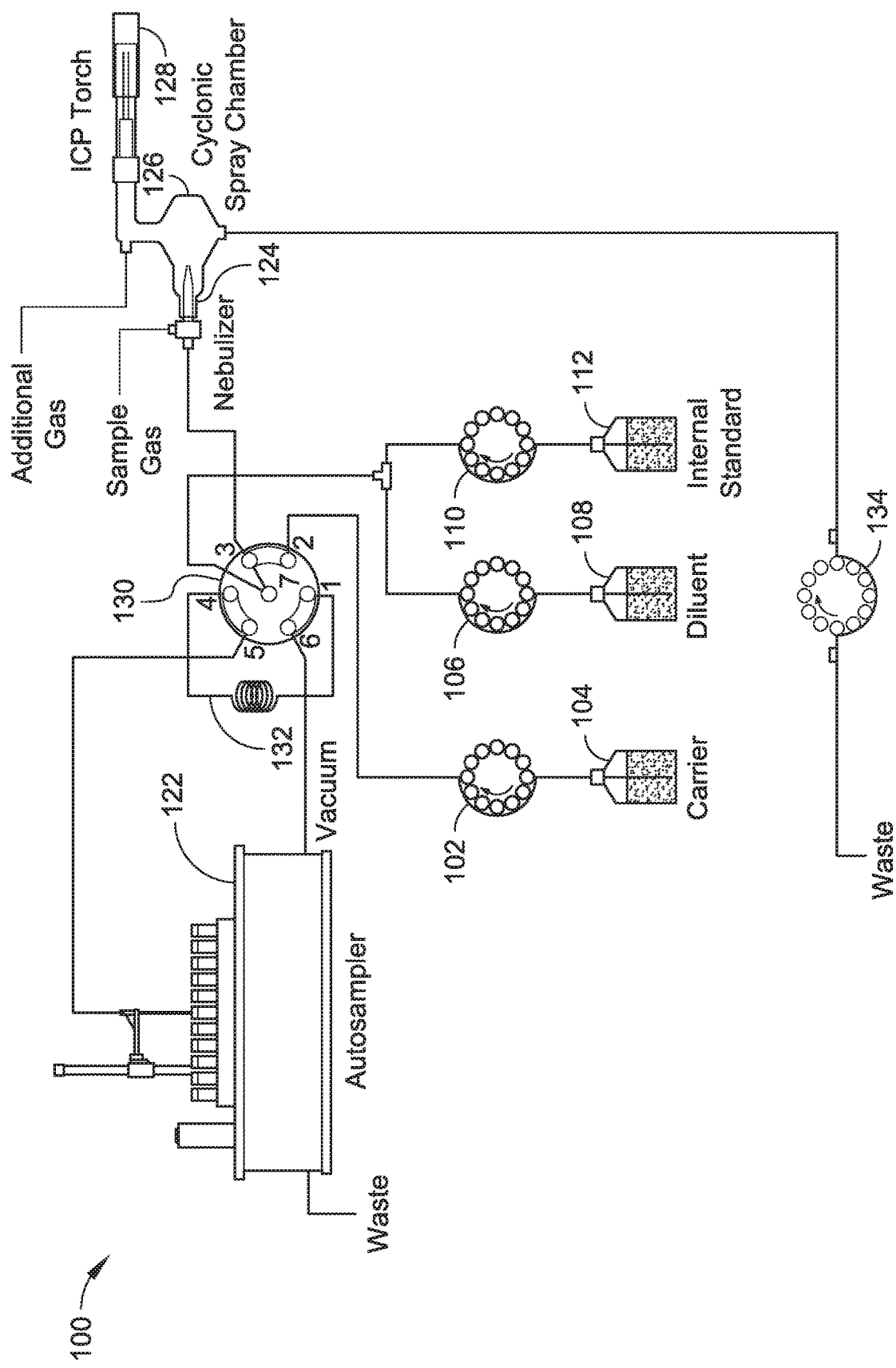
FIG. 1A is a schematic showing an automated sampling system implemented in accordance with an embodiment of the present disclosure.

Peristaltic pumps can be used to dilute an internal standard, spike or matrix solution, and/or a sample for analysis with spectrometry equipment. Overtime, however, tubing connected to a peristaltic pump can wear unevenly, especially if a pump is completely turned off while another pump is left running. In such cases, the tubing associated with the less used pump is more likely to kink, crease, or create pinch points. This uneven wear may affect long-term stability when undiluted samples are analyzed. Further, as successive analyses are ran, it becomes necessary to inspect and change worn tubing, adding to the time, complexity, and expense associated with using the equipment.

A system and method are described for continuously running peristaltic pumps by selectively adjusting a flow of the fluids pumped by each peristaltic pump. In this manner, the disclosed system and method can prevent uneven wear, kinking, creasing, or pinching, and other problems associated with intermittently stopping one or more peristaltic pumps while others are running.

In an embodiment, a system includes a first peristaltic pump, a second peristaltic pump, a third peristaltic pump, and a controller configured to control respective flow rates of the pumps. The first peristaltic pump can be configured to drive a carrier fluid. The second peristaltic pump can be configured to drive a diluent fluid. The third peristaltic pump can be configured to drive an internal standard, spike or matrix solution. The controller is configured to adjust respective flow rates of the first, second, and third peristaltic pumps. The controller can be configured to run the second peristaltic pump at least at a minimum predetermined flow rate whenever the third peristaltic pump is active. In some embodiments, the controller is further configured to run the first peristaltic pump at least at the minimum predetermined flow rate whenever the third peristaltic pump is active. In some embodiments, the controller is further configured to run the second peristaltic pump at least at the minimum predetermined flow rate whenever the first peristaltic pump is active. In some embodiments, the controller is further configured to run the third peristaltic pump at a scaled flow rate based on a scaling factor associated with the minimum predetermined flow rate. In some embodiments, the controller is further configured to run the first peristaltic pump at a scaled flow rate based on a scaling factor associated with the minimum predetermined flow rate.

By running first, second, and third (and possibly more) peristaltic pumps continuously when any of the other peristaltic pumps are running, the system prevents uneven wear on tubing and potential kinking, creasing, or pinching of tubes due to lack of peristaltic pump activity. In some implementations, scaling factors are used to account for the constant flows of all three pumps. For example, all pumps may be configured to run simultaneously and continuously when at least one pump is activated and the flow rates are all scaled based on the minimum flow rate of the diluent, carrier, or internal standard/spike/matrix pump.

Example Implementations

Figure 1B:
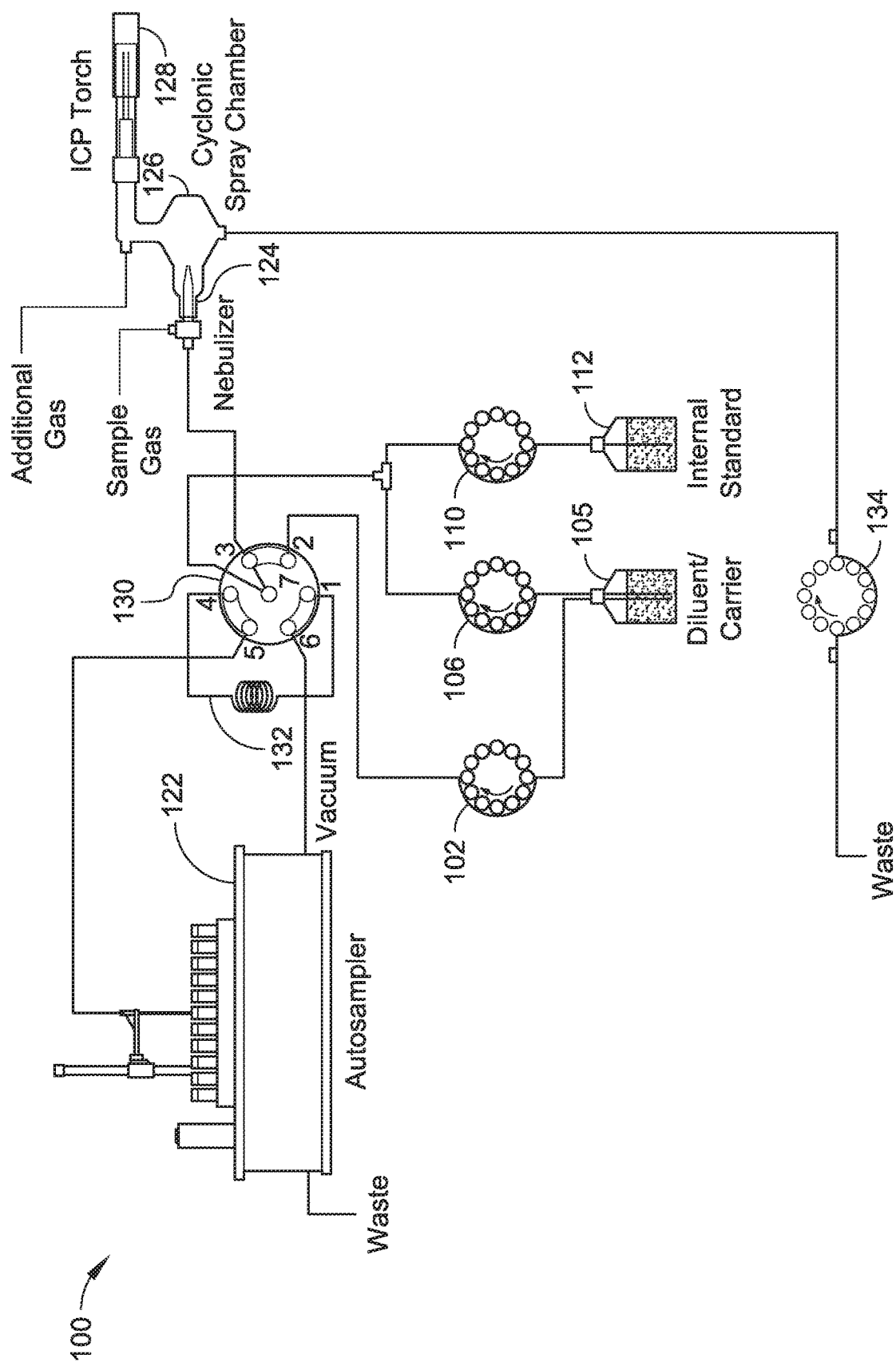
FIG. 1B is a schematic showing an automated sampling system implemented in accordance with an embodiment of the present disclosure.

FIGS. 1A and 1B illustrate embodiments of an automated sampling system 100 for an ICP analysis instrument. The system 100 includes a first peristaltic pump 102 for driving carrier 104. For example, the first peristaltic pump 102 can drive a carrier solution that pushes a sample from a sampling valve, where the sample can be introduced into the sampling valve by an automated sampler 122. In some embodiments, the first peristaltic pump 102 can instead drive a sample directly from a sample container (e.g., with no carrier required for pushing the sample). The system 100 further includes at least one other peristaltic pump. For example, the system 100 includes a second peristaltic pump 106 for driving diluent fluid 108 to dilute the sample or an internal standard, spike or matrix solution by a selected factor. In some embodiments, the system 100 further includes a third peristaltic pump 110 for driving an internal standard, spike or matrix solution 112. The system 100 can include additional pumps (e.g., more carrier/diluent pumps or more internal standard, matrix, or spike pumps) or fewer pumps (e.g., internal standard, matrix, or spike pump).

In an embodiment, the system 100 includes a sampler assembly, such as an autosampler 122, for automatically collecting a sample from a number of samples contained in test tubes. The system 100 can also include a nebulizer 124 coupled with a cyclonic spray chamber 126 for supplying an Inductively Coupled Plasma (ICP) torch 128 with gas or aerosolized samples from the autosampler 122. In embodiments, a rotary valve 130 may receive fluid from the autosampler 122, the carrier 104, the diluent fluid 108, and the internal standard, matrix, or spike 112 and supply the fluid to the nebulizer 124. In some embodiments (e.g., as shown in FIG. 1B), the carrier fluid and the diluent fluid can be the same fluid (i.e., from a common diluent/carrier container 105). In other embodiments, the diluent and carrier containers are distinct, as shown in FIG. 1A. The rotary valve 130 may also be coupled with a sample loop 132 for holding the sample. A peristaltic pump 134 may be used to evacuate waste from the spray chamber 126. For example, the peristaltic pump 134 may be connected to a drain port of the spray chamber 126.

Figure 2:
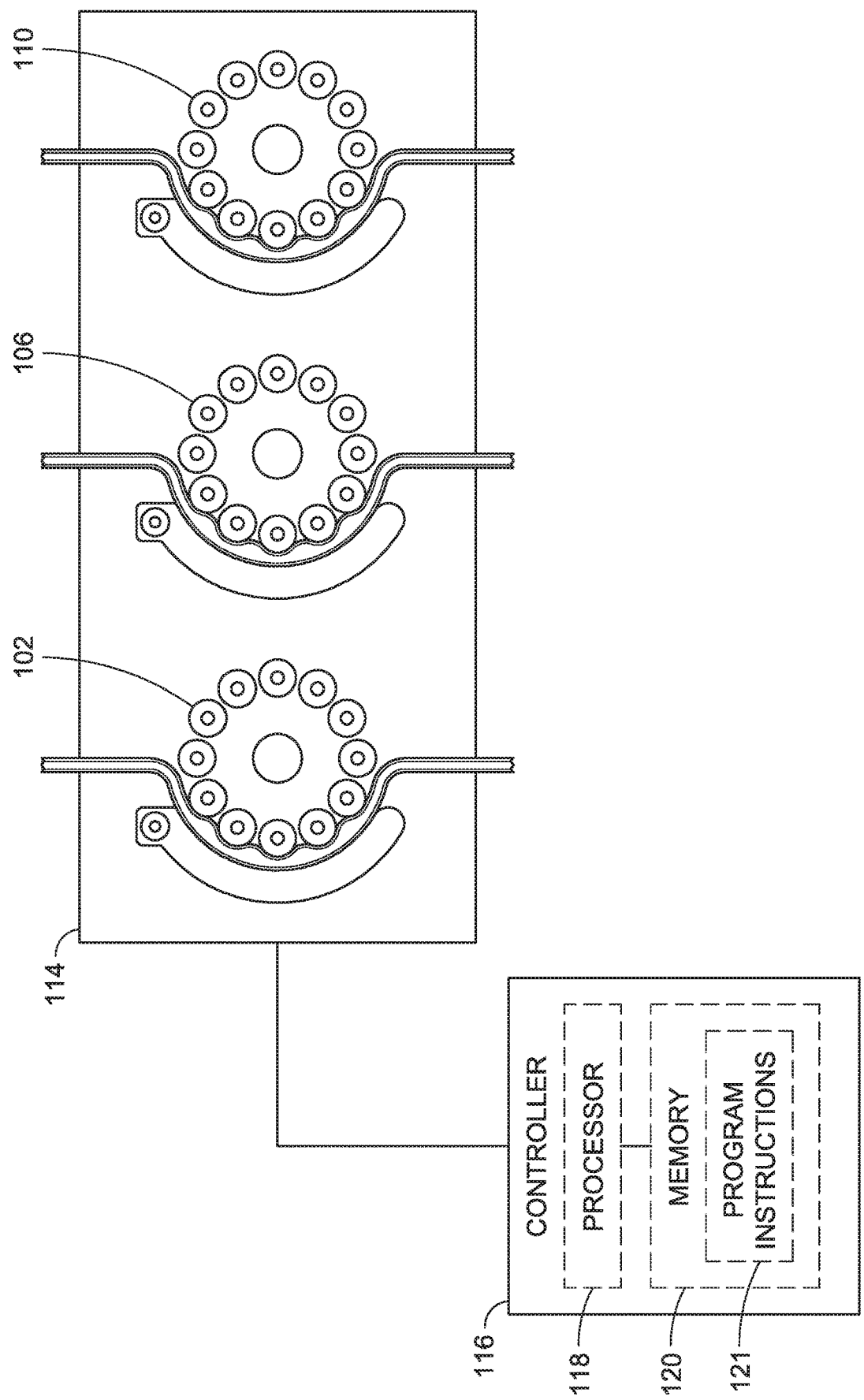
FIG. 2 is a schematic showing a peristaltic pump system for the automated sampling system implemented in accordance with an embodiment of the present disclosure.

FIG. 2 shows an embodiment of a peristaltic pump system, wherein three peristaltic pumps 102, 106, and 110 are built into a common housing 114. In other embodiments, the housing can include two pumps or more than three pumps, or each of the pumps can have an individual pump housing. The pumps 102, 106, and 110 can be driven by a controller 116. The controller 116 may include a processor 118 configured to execute program instructions 121 from a memory 120. According to the program instructions 121 (e.g., one or more executable software modules), the processor 118 can control flow rates (i.e., rotation rates) of the peristaltic pumps 102, 106, and 110. In some embodiments, the controller 116 is configured (e.g., programmed) to run the pumps 102, 106, 110 (or only carrier and diluent pumps 102 and 106, or more pumps) in a manner that causes the pumps to all run simultaneously and continuously when any of the other pumps are active (i.e., running).

In an embodiment, the controller 116 is configured to run the second peristaltic pump 106 (diluent pump) at least at a minimum predetermined flow rate whenever the third peristaltic pump 110 (internal standard/matrix/spike pump) is active (or vice versa). Thus, the diluent pump is constantly running, which avoids uneven wear on the tubing or potential kinking, creasing, or pinching. In some embodiments, the minimum flow rate is at least 150 microliters per minute; however, even lower flow rates may be used. The controller 116 can also be configured to run the third peristaltic pump 110 at a scaled flow rate based on a scaling factor associated with the minimum predetermined flow rate. For example, the internal standard, matrix, or spike solution 112 can be introduced at a scaled flow rate to make up for the continuous flow of diluent fluid 108.

The controller 116 can also be configured to run the first peristaltic pump 102 (carrier pump) at least at the minimum predetermined flow rate whenever the third peristaltic pump 110 is active (or vice versa). The controller 116 can also be configured to run the first peristaltic pump 102 at least at the minimum predetermined flow rate whenever the second peristaltic pump 106 is active (or vice versa). In some embodiments, the system 100 only includes the first and second peristaltic pumps (e.g., without the third peristaltic pump 110), and as such, the controller 116 may only be configured to run the first peristaltic pump 102 at least at the minimum predetermined flow rate whenever the second peristaltic pump 106 is active (or vice versa). The controller 116 can also be configured to run the first peristaltic pump 102 at a scaled flow rate based on a scaling factor associated with the minimum predetermined flow rate. For example, carrier solution can be introduced at a scaled flow rate to make up for the continuous flow of diluent fluid.

A scaled flow rate can be used when one of the peristaltic pumps is used to drain the spray chamber 126. When sample is pumped in, a high speed uptake can be employed to get the sample to the instrument faster. During this time, the diluent fluid 108 may be pumped in. The diluent fluid 108 may be pumped in at the same or at a substantially similar flow rate as the sample/carrier fluid 104 so that: 1) if there is a dilution factor, it will not take a long time for the spray chamber 126 to wash out and become stable; and 2) for more even pump wear between the carrier and diluent pumps 102 and 106. In order to compensate for the increased flow rates from the carrier and diluent pumps 102 and 106, controller 116 can be configured to run the third peristaltic pump 110 at a higher flowrate, where the third peristaltic pump can be configured to drain the spray chamber 126 (e.g., in place of pump 134). For example, controller 116 can be configured to run the third peristaltic pump 110 at twice the flow rate it is run at during the high speed uptake.

Figure 3:
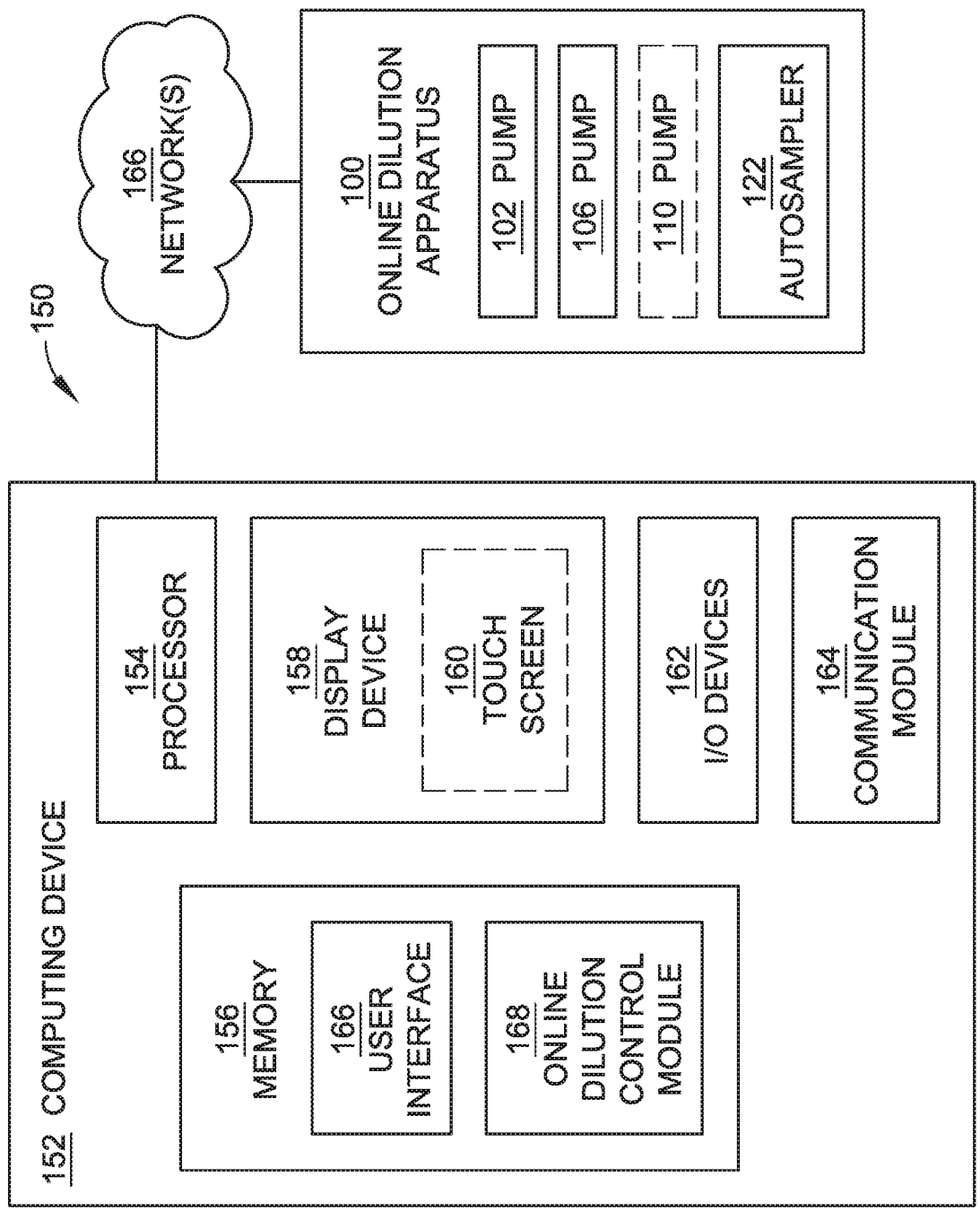
FIG. 3 is a block diagram showing a control system for the automated sampling system implemented in accordance with an embodiment of the present disclosure.

FIG. 3 illustrates a control system 150 for the automated sampling system 100. The control system can include a computing device 152 (e.g., including a processor 154 and a memory 156). In some embodiments, the computing device 152 is configured to perform the functionality of controller 116 (i.e., the computing device 152 is the controller 116). In other embodiments, the computing device 152 is in communication with the controller 116. The processor 154 provides processing capability for the computing device 152 and may include any number of processors, micro-controllers, or other processing systems, and resident or external memory for storing data and other information accessed or generated by the computing device 152. The processor 154 may execute one or more software programs that implement the techniques and modules described herein. The processor 154 is not limited by the materials from which it is formed or the processing mechanisms employed therein and, as such, may be implemented via semiconductor(s) and/or transistors (e.g., electronic integrated circuits (ICs)), and so forth.

The memory 156 is an example of device-readable storage media that provides storage capability to store various data associated with the operation of the computing device 152, such as the software program and code segments mentioned above, or other data to instruct the processor 154 and other elements of the computing device 152 to perform the techniques described herein. Although a single memory 156 is shown, a wide variety of types and combinations of memory may be employed. The memory 156 may be integral with the processor 154, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the computing device 152, the memory 156 may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The computing device 152 includes a display 158 to display information to a user of the computing device 152. In embodiments, the display 158 may comprise a CRT (Cathode Ray Tube) display, an LED (Light Emitting Diode) display, an OLED (Organic LED) display, an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display 158 may be backlit via a backlight such that it may be viewed in the dark or other low-light environments.

The display 158 may be provided with a touch screen 160 to receive input (e.g., data, commands, etc.) from a user. For example, a user may operate the computing device 152 by touching the touch screen 160 and/or by performing gestures on the touch screen 160. In some embodiments, the touch screen 160 may be a capacitive touch screen, a resistive touch screen, an infrared touch screen, combinations thereof, and the like. The computing device 152 may further include one or more input/output (I/O) devices 164 (e.g., a keypad, buttons, a wireless input device, a thumbwheel input device, a trackstick input device, and so on). The I/O devices 164 may include one or more audio I/O devices, such as a microphone, speakers, and so on.

The computing device 152 may also include a communication module 164 representative of communication capability to permit computing device 152 to send/receive data between different devices (e.g., components/peripherals) and/or over one or more networks 166. Communication module 164 may be representative of a variety of communication components and capability including, but not necessarily limited to: a browser; a transmitter and/or receiver; data ports; software interfaces and drivers; networking interfaces; data processing components; and so forth.

The one or more networks 166 are representative of a variety of different communication pathways and network connections which may be employed, individually or in combinations, to communicate among the components of the variable online dilution environment 150. Thus, the one or more networks 166 may be representative of communication pathways achieved using a single network or multiple networks. Further, the one or more networks 166 are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth.

Examples of wireless networks include, but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing device 152 is illustrated as including a user interface 166, which is storable in memory 156 and executable by the processor 154. The user interface 166 is representative of functionality to control the display of information and data to the user of the computing device 152 via the display 158. In some embodiments, the display 158 may not be integrated into the computing device 152 and may instead be connected externally using universal serial bus (USB), Ethernet, serial connections, and so forth. The user interface 166 may provide functionality to allow the user to interact with one or more applications of the computing device 152 by providing inputs via the touch screen 160 and/or the I/O devices 162. For example, the user interface 166 may cause an application programming interface (API) to be generated to expose functionality to an online dilution control module 168 to configure the application for display by the display 158 or in combination with another display. In embodiments, the API may further expose functionality to configure the online dilution control module 168 to allow the user to interact with an application by providing inputs via the touch screen 160 and/or the I/O devices 162.

Online dilution control module 168 may comprise software, which is storable in memory 156 and executable by the processor 154, to perform a specific operation or group of operations to furnish functionality to the computing device 152. The online dilution control module 168 provides functionality to control the dilution of the internal standard, spike or matrix solution and/or the samples from the autosampler 122. For example, the online dilution control module 168 may control flow rates of pumps 102, 106, and 110 (e.g., in accordance with embodiments described herein).

In some embodiments, the user interface 166 may include a browser (e.g., for implementing functionality of the online dilution control module 168). The browser enables the computing device 152 to display and interact with content such as a webpage within the World Wide Web, a webpage provided by a web server in a private network, and so forth. The browser may be configured in a variety of ways. For example, the browser may be configured as an online dilution control module 168 accessed by the user interface 166. The browser may be a web browser suitable for use by a full resource device with substantial memory and processor resources (e.g., a smart phone, a personal digital assistant (PDA), etc.).

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof.

Example Processes

The following discussion describes procedures that may be implemented in the online dilution apparatus providing offset peristaltic pump capability. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 4:
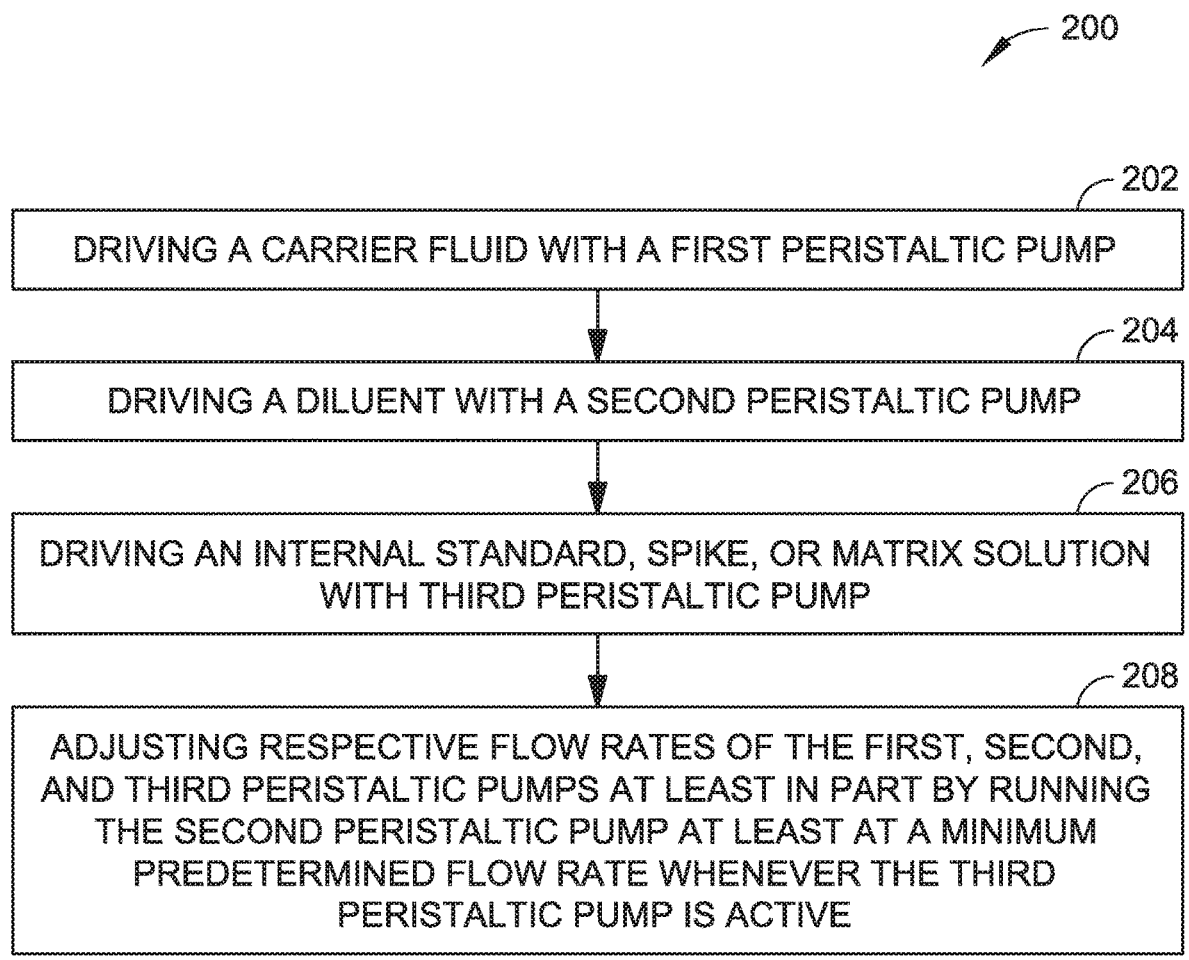
FIG. 4 is a flow diagram showing a method for controlling peristaltic pumps for an automated sampling system in accordance with an example implementation of the present disclosure.

FIG. 4 illustrates a method 200 of controlling peristaltic pumps (e.g., pumps 102, 106, and 110) for an automated sampling system, such as the system 100 described above. The method 200 can include: driving a carrier fluid with a first peristaltic pump (block 202); driving a diluent fluid with a second peristaltic pump (block 204); driving an internal standard, spike or matrix solution with third peristaltic pump (block 206); and adjusting respective flow rates of the first peristaltic pump, the second peristaltic pump, and the third peristaltic pump at least in part by running the second peristaltic pump at least at a minimum predetermined flow rate whenever the third peristaltic pump is active (block 208). In some embodiments, adjusting respective flow rates of the first, second, and third peristaltic pumps (block 208) further includes running the first peristaltic pump at least at the minimum predetermined flow rate whenever the third peristaltic pump is active. In some embodiments, adjusting respective flow rates of the first, second, and third peristaltic pumps (block 208) further includes running the second peristaltic pump at least at the minimum predetermined flow rate whenever the first peristaltic pump is active. In some embodiments, adjusting respective flow rates of the first, second, and third peristaltic pumps (block 208) further includes running the third peristaltic pump at a scaled flow rate based on a scaling factor associated with the minimum predetermined flow rate. In some embodiments, adjusting respective flow rates of the first, second, and third peristaltic pumps (block 208) further includes running the first peristaltic pump at a scaled flow rate based on a scaling factor associated with the minimum predetermined flow rate.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A peristaltic pump system, comprising:
a first peristaltic pump configured to drive a carrier fluid;
a second peristaltic pump configured to drive a diluent fluid;
a third peristaltic pump configured to drive an internal standard, spike or matrix solution;
a valve positioned downstream from each of the first peristaltic pump, the second peristaltic pump, and the third peristaltic pump, the valve configured to receive each of the carrier fluid, the diluent fluid, and the internal standard, spike or matrix solution via action of the first peristaltic pump, the second peristaltic pump, and the third peristaltic pump;
a spray chamber fluidically coupled with the valve to receive each of the carrier fluid, the diluent fluid, and the internal standard, spike or matrix solution from the valve;
a fourth peristaltic pump coupled with a drain port of the spray chamber; and
a controller for adjusting respective flow rates of the first, second, and third peristaltic pumps, the controller configured to run the second peristaltic pump at least at a minimum predetermined flow rate whenever the third peristaltic pump is active and to run the second peristaltic pump at least at the minimum predetermined flow rate whenever the first peristaltic pump is active.

2. The peristaltic pump system of claim 1, wherein the controller is further configured to run the first peristaltic pump at least at the minimum predetermined flow rate whenever the third peristaltic pump is active.

3. The peristaltic pump system of claim 1, wherein the controller is further configured to run the third peristaltic pump at least at the minimum predetermined flow rate whenever the first peristaltic pump is active.

4. The peristaltic pump system of claim 1, wherein the controller is further configured to run the first peristaltic pump at least at the minimum predetermined flow rate whenever the second peristaltic pump is active.

5. The peristaltic pump system of claim 1, wherein the controller is further configured to run the third peristaltic pump at least at the minimum predetermined flow rate whenever the second peristaltic pump is active.

6. The peristaltic pump system of claim 1, wherein the controller is further configured to run the third peristaltic pump at a scaled flow rate based on a scaling factor associated with the minimum predetermined flow rate.

7. The peristaltic pump system of claim 1, wherein the controller is further configured to run the first peristaltic pump at a scaled flow rate based on a scaling factor associated with the minimum predetermined flow rate.

8. The peristaltic pump system of claim 1, further comprising:
a common housing configured to at least partially contain the first peristaltic pump, the second peristaltic pump, and the third peristaltic pump.

* * * * *